United States Patent
Palmaer

(10) Patent No.: US 6,382,405 B1
(45) Date of Patent: May 7, 2002

(54) SOLID TOP RADIUS CONVEYOR BELT

(75) Inventor: Eric K. Palmaer, Granite Bay, CA (US)

(73) Assignee: KVP Plastic Belting, Inc., Rancho Cordova, CA (US)

( * ) Notice: Subject to any disclaimer, the term of this patent is extended or adjusted under 35 U.S.C. 154(b) by 0 days.

(21) Appl. No.: 09/513,798

(22) Filed: Feb. 25, 2000

(51) Int. Cl.[7] .............................................. B65G 17/06
(52) U.S. Cl. ...................................... 198/853; 198/850
(58) Field of Search ............................... 198/850, 851, 198/852, 853, 844.1, 849, 699.1

(56) References Cited

U.S. PATENT DOCUMENTS

| | | |
|---|---|---|
| 3,944,059 A | 3/1976 | Garvey |
| 4,429,785 A | 2/1984 | Dango |
| 4,742,907 A | 5/1988 | Palmaer |
| 4,958,726 A | 9/1990 | Fett et al. |
| 5,076,422 A | 12/1991 | Clopton |
| 5,127,515 A | 7/1992 | Damkjaer |
| 5,181,601 A | 1/1993 | Palmaer et al. |
| 5,199,551 A | 4/1993 | Wallaart et al. |
| 5,293,989 A * | 3/1994 | Garbagnati ............. 198/853 X |
| 5,307,923 A | 5/1994 | Damkjaer |
| 5,439,099 A * | 8/1995 | Bos et al. ................... 198/853 |
| 5,497,874 A * | 3/1996 | Layne .................... 198/698 X |
| 5,507,383 A * | 4/1996 | Lapyere et al. ............. 198/853 |
| 5,706,934 A | 1/1998 | Palmaer et al. |
| 5,797,820 A * | 8/1998 | Endo ....................... 198/853 X |
| 5,921,379 A * | 7/1999 | Horton .................... 198/852 X |
| 6,142,295 A * | 11/2000 | Greve ..................... 198/852 X |
| 6,148,990 A * | 11/2000 | Lapeyre et al. ......... 198/853 X |
| 6,189,686 B1 * | 2/2001 | Shibayama et al. ..... 198/853 X |

FOREIGN PATENT DOCUMENTS

| | | |
|---|---|---|
| WO | 9314010 | 1/1993 |

\* cited by examiner

*Primary Examiner*—Christopher P. Ellis
*Assistant Examiner*—Gene O. Crawford
(74) *Attorney, Agent, or Firm*—Thomas M. Freiburger

(57) ABSTRACT

A plastic modular conveyor belt of the type which is capable of traversing lateral curves, with module rows collapsing together at inner sides of curves, has a solid deck over a central portion, but leaving terminal ends of interdigited projections not covered by the deck structure. The solid decks on each module are above the level of the interdigited projections, such that upon traversing curves the projections toward the inside of the curve can slide under the deck of the adjacent module, and the dimensions of the solid decks allow the inner edges of the module rows to collapse substantially fully without limitation by the edges of the decks, which do not lap over one another. The gap between module rows in straight belt travel is mostly closed by the interdigited terminal portions of the projections. In some embodiments the edges of the decks include interdigiting finger structure to provide a more continuous load-supporting surface.

6 Claims, 7 Drawing Sheets

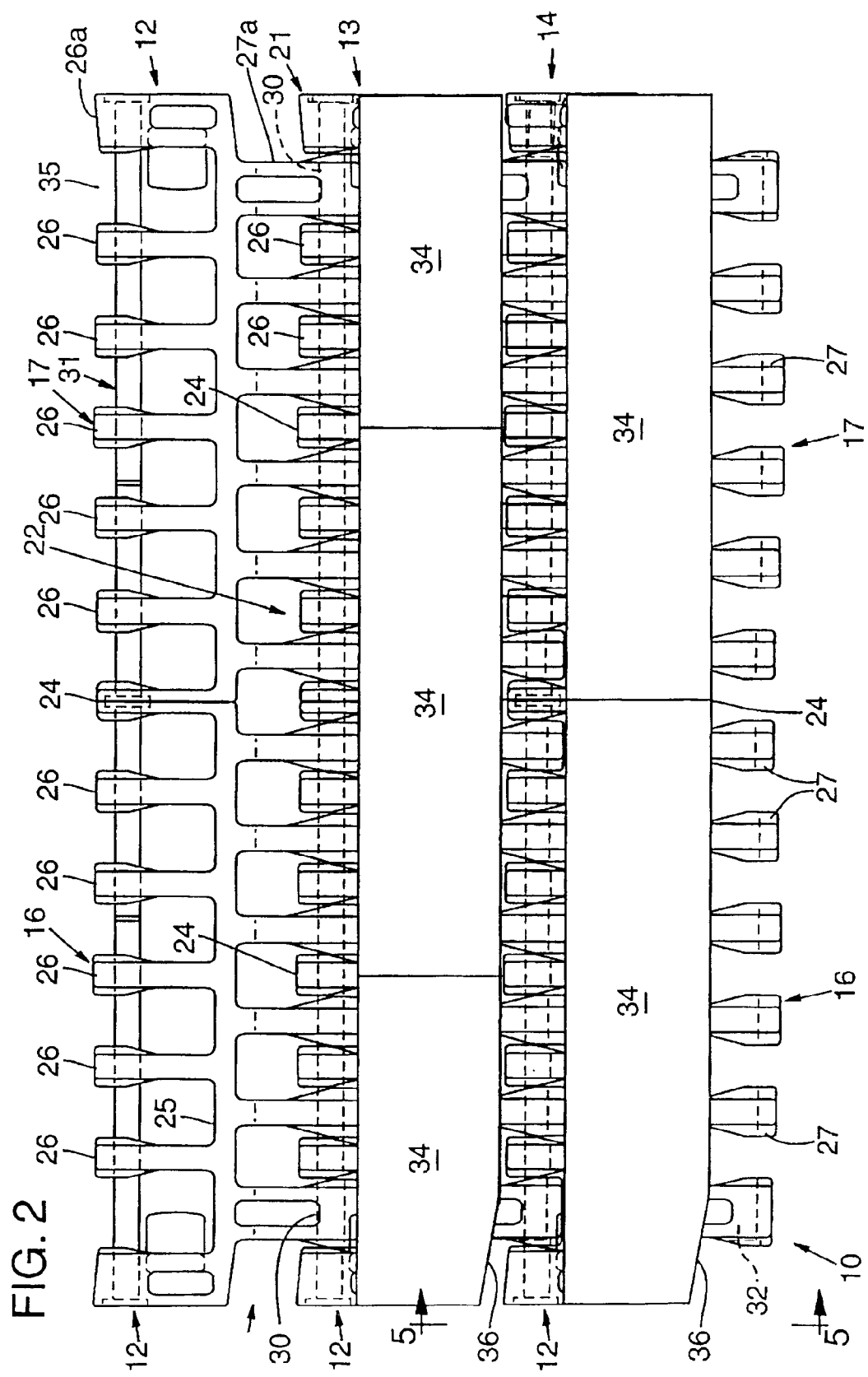

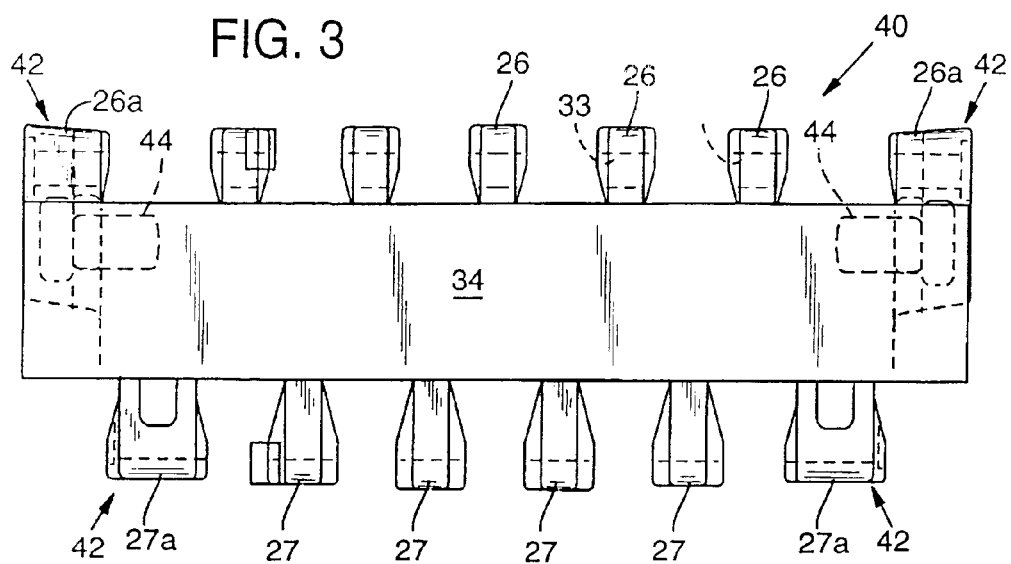
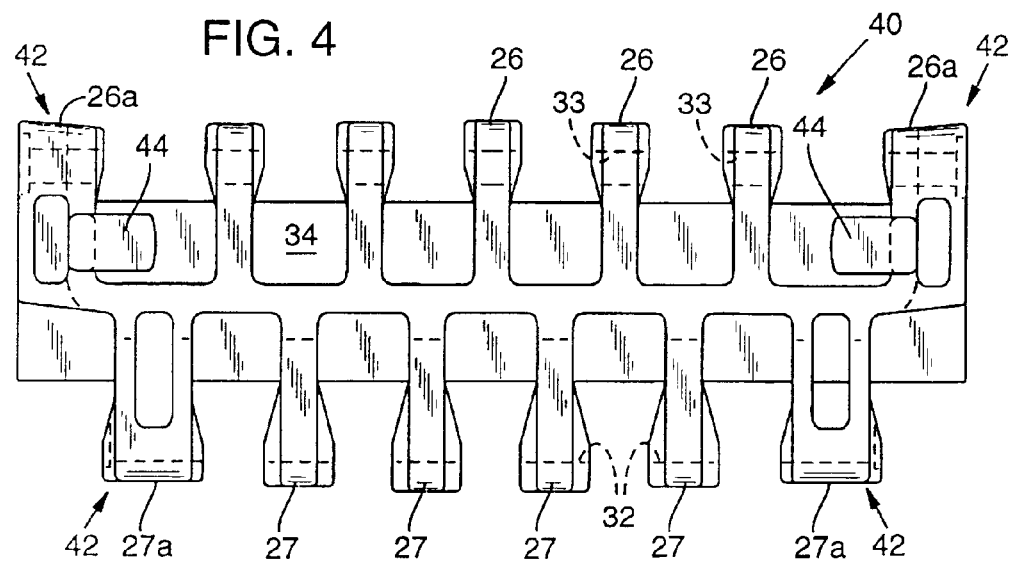
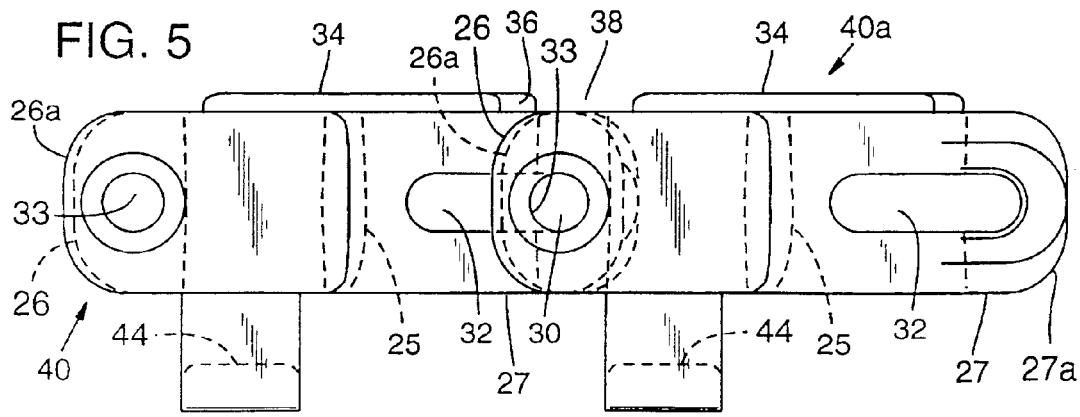

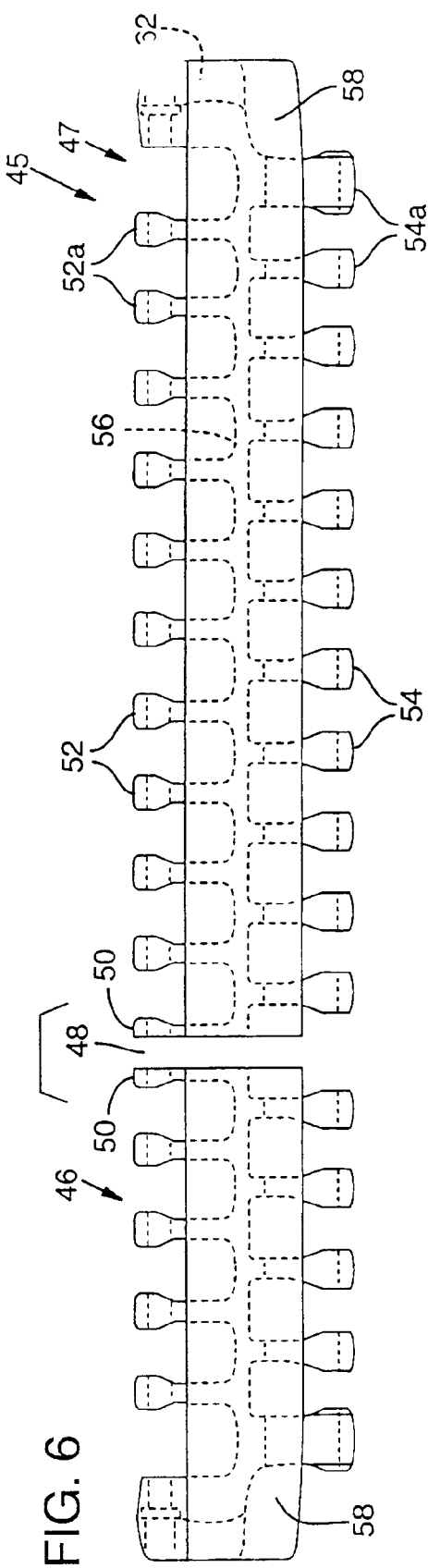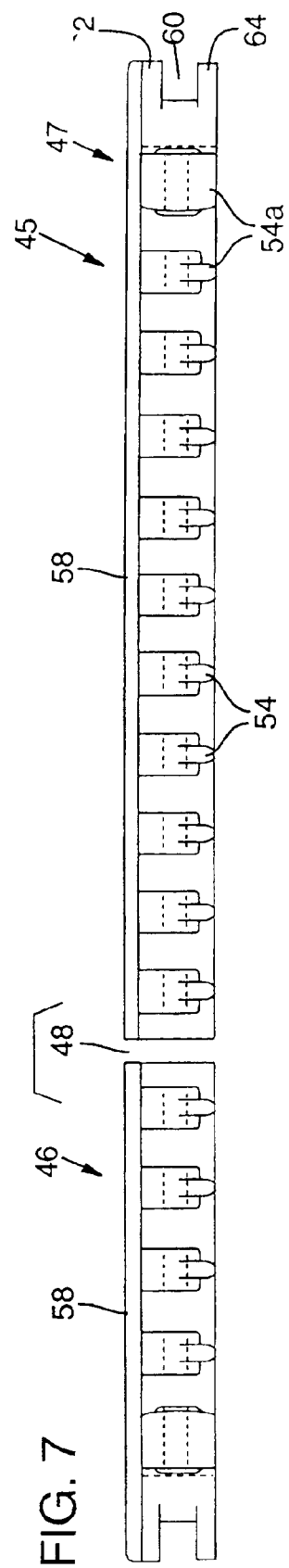

SOLID TOP RADIUS CONVEYOR BELT

BACKGROUND OF THE INVENTION

The invention concerns conveyor belts assembled from plastic modules to produce a belt in virtually any length and width. In particular the invention relates to a conveyor belt capable of following a path including both straight and curved sections, and such a belt which has a substantially continuous solid top supporting surface.

Modular plastic conveyor belts, and the modules of which they are constructed, are very well known and the subject of a large number of patents. See, for example, U.S. Pat. Nos. 5,181,601 and 4,742,907, owned by the assignee of the present invention. The belts of both those patents are capable of straight and curving travel, due to the provision of slotted holes in link ends on one side of each module, and elongated interdigited link ends, rendering the ability of module rows to collapse together at the inside of a curve.

Belts having solid, substantially closed conveying surfaces are also very well known. For an example of a modular plastic conveyor belt with a solid conveying surface, see U.S. Pat. No. 5,706,934, also owned by the assignee of the present invention.

Conveyor belts for some specific purposes have included solid conveying surfaces which remain closed when the conveyor traverses a curve. To achieve this, such solid top belts have generally included plates which lap over one another, or lap more deeply over one another on curves, to achieve the required contraction at the inner side of a curve. Examples are the metal conveyors found in baggage handling equipment at airports. An example of such a lap-over structure in a modular conveyor belt is found in patent publication WO93/14010. The components of that belt were disclosed as being either of metal or plastic; the belt modules did not include a multiplicity of interdigited link ends or projections as in the above-referenced patents and as in the present invention described below.

In many applications there is a need for a conveyor belt, having the versatility and practical advantages of modular construction as in the '601 patent referenced above, and at the same time having a substantially solid or continuous conveying surface without the sometimes objectionable feature of one plate sliding over another which can result in wear and moving edges that can catch or snag conveyed articles.

SUMMARY OF THE INVENTION

According to this invention, a plastic modular conveyor belt, of the type described in U.S. Pat. No. 5,181,601, achieves the above stated goals. Such a belt, of the type which is capable of traversing lateral curves, with module rows collapsing together at inner sides of curves, has a solid deck over a central portion, but leaving terminal ends of interdigited projections not covered by the deck structure. The solid decks on each module are above the level of the interdigited projections, such that upon traversing curves the projections toward the inside of the curve can slide under the deck of the adjacent module, and the dimensions of the solid decks are such as to allow the inner sides of the module rows to collapse substantially fully without interference by the edges of the decks, which do not lap over one another.

While traveling through a straight section, the conveyor belt has a gap between succeeding module rows, but this is substantially closed by the interdigited terminal portions of the projections, so that only relatively small objects would be capable of falling through, and such small objects are not carried on the belt.

In some embodiments the edges of the deck structures include longitudinally extending fingers for providing a more continuous load-supporting surface, the fingers becoming more deeply enmeshed in corresponding slots of a succeeding module when the module rows come together at the inside of a curve.

A further embodiment of the invention is for conveyor situations where all curves are in the same direction. In that embodiment, the solid deck or decks making up a module row define a wedge shape, generally trapezoidal, so that on the curves, are all generally of a prescribed radius, the solid deck portions form a truly continuous conveying surface. In straight sections of such a conveyor, the module rows form generally triangular shaped gaps between them, but these are substantially filled by the terminal ends of the interdigited projections at a slightly lower level. Again, interdigited finger structure can be included to provide a more continuous conveying surface in these gaps.

It is thus among the objects of the invention to improve on conveyors capable of traversing straight and curving sections while presenting a substantially closed or continuous conveying surface, by combining the features of interdigited molded plastic conveyor modules with solid deck surfaces covering most of the modules, without the need for plates lapping over one another, therefore providing belts having a substantially continuous top, not completely impervious but sufficiently so for the type of articles to be carried. These and other objects, advantages and features of the invention will be apparent from the following description of a preferred embodiment, considered along with the accompanying drawings.

DESCRIPTION OF THE DRAWINGS

FIG. 2 is a view similar to FIG. 1, but showing the belt portion in a straight section.

FIG. 3 is a plan view showing a module.

FIG. 4 is a bottom plan view of the module FIG. 3.

FIG. 5 is an end elevation view showing a module and indicating a portion of a second module interlinked with the first.

FIG. 6 is a plan view showing several modules side by side, in another embodiment.

FIG. 7 is a partial view in longitudinal elevation of a module of FIG. 6.

DESCRIPTION OF THE PREFERRED EMBODIMENTS

Figure 1:
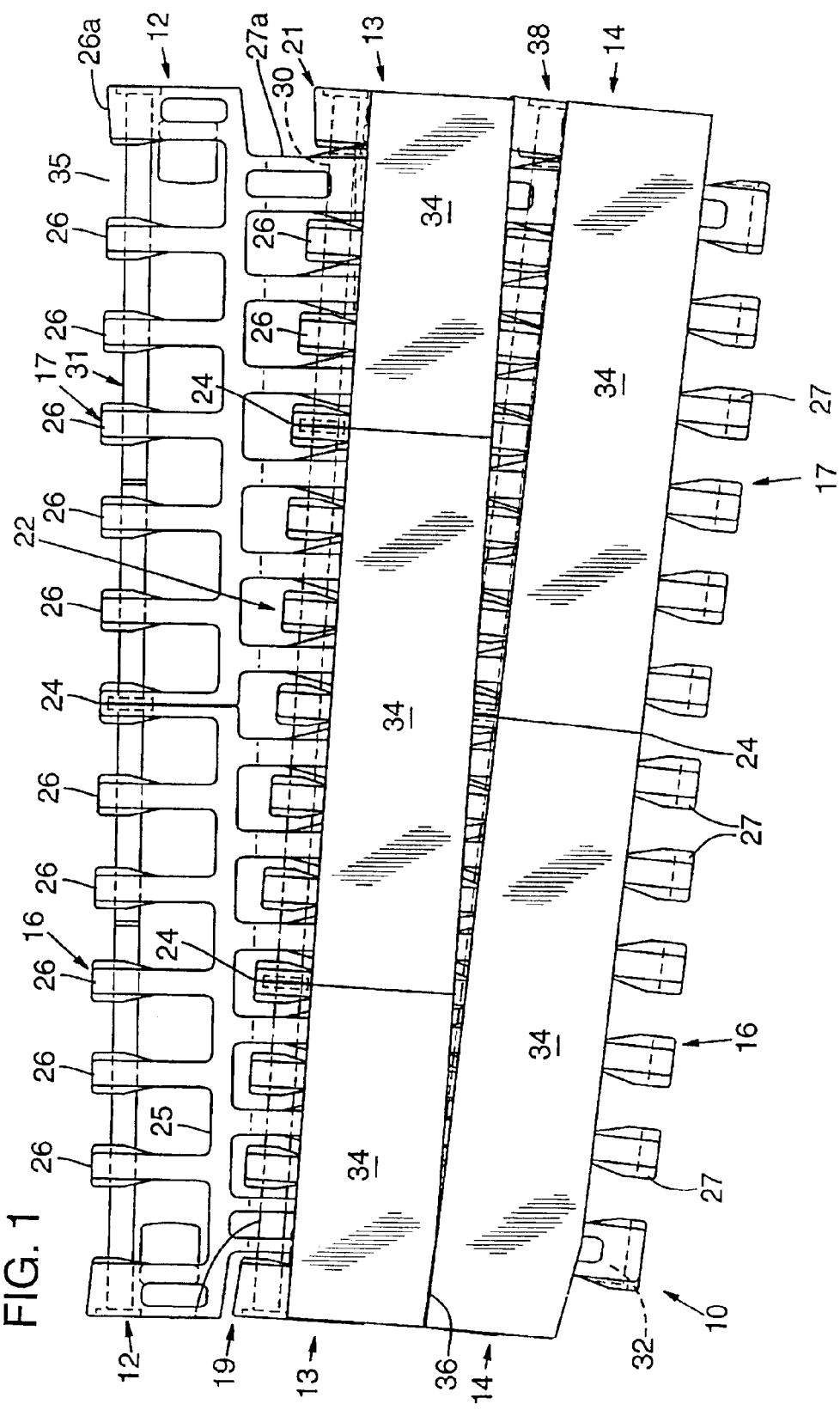
FIG. 1 is a plan view showing a portion of a conveyor belt of the invention, comprised of several modules, with the belt section shown traversing a curve.

FIG. 1 shows a portion 10 of a conveyor belt formed of a series of module rows 12, 13, 14, etc. as shown. Although each belt row can comprise a single module, as further illustrated below, the belt in wider implementations will normally have two or more individual modules, as at 16 and 17 in the module row 12 and as at 19, 21 and 22 in the module row 13. The modules are thus staggered in position, with joints 24 between side-by-side modules not forming a single line through the conveyor but being offset in position as shown. Thus, the module 14 is similar to the module 12, with the row being made up of a pair of modules 16 and 17 between which is a central joint 24.

Each module is comprised of a central bar or intermediate section 25 from which extend rows of first projections or link ends 26 in one longitudinal direction and second projections or link ends 27 in the opposite longitudinal direction. These projections become interdigited in the assembled belt as shown, connected by a connecting rod 30 which passes through openings in the projections, as shown in U.S. Pat. No. 5,181,601, incorporated herein by reference. Projection openings 32 on the second projections 27, i.e. those extending in one direction from each module, are slotted, as is well known from the referenced U.S. Pat. No. 5,181,601 and other patents showing plastic modular conveyor belts capable of curving travel. Those openings 32 allow the inner edge of the belt, on the left in FIG. 1, to collapse together as shown in FIG. 1.

Also as shown in '601 patent, the modules at the ends of each belt module in this particular embodiment have integral sideplates, or special link ends 26a and 27a to withstand the high tension in the outside of a curve in a conveyor made up of such modules.

The central feature of this invention is the provision of solid decks 34 on the modules. These solid decks are positioned in the modules so as to extend essentially entirely from left to right in each module row (although lesser width is possible), and to extend in longitudinal directions as far as possible without causing interference with the collapse of the modules together at the inside of a curve.

As seen in FIG. 1, one or both of the confronting deck slabs 34, at the extreme ends of the module rows, can have an angled edge 36 to enable the two decks to nest together more closely, or, stated another way, to enable the generally triangular gap 38 between decks in the module rows to be smaller, simply by truncating a small portion of one or both decks near the edge of the row. This assumes the degree of collapsing together of the two rows at the inside edge of the curve is limited only by the configurations of the link ends or projections 26 as nesting between projections 27 from the adjacent module row. The object is not to interfere with that nesting together capability, which would limit the radius of turn available, while still making the gap 38 as small as possible.

The solid decks 34 are at a level higher than the projections 26, 27 and the intermediate bars 25 of the modules. Preferably the decks are integrally molded with the modules, with the bottoms of the decks being substantially at the level of the tops of the projections, so that the projections of one module row can slide under the deck slabs of the adjacent module row, as illustrated in FIG. 1.

FIG. 2 shows the belt section 10 of FIG. 1, but in a straight section of conveyor. This view illustrates the gaps 38 at their maximum, when there is no angular shifting of module rows and the chain of rows is in tension, separating the decks to the maximum extent.

FIG. 3 shows a single module 40 in top plan view, in a particular embodiment and configuration. In this the module 40 is shown as having a width which will become the full width of the conveyor belt, the module having edge structure 42 which is similar at both edges and which serves to accept tension of the belt at the outside of a curve, as described in U.S. Pat. No. 5,181,601. The module 40 may be similar in most respects to the modules disclosed in U.S. Pat. No. 5,181,601, except in having a solid top deck 34 as shown in FIGS. 1 and 2. The link ends or projections 26 and 27, the latter having slotted openings 32, are seen with their terminal ends 26a, 27a extending out longitudinally from under the deck structure 34, which is at a level above the tops of the projections 26, 27. FIG. 5 shows the module 40 in edge view, in elevation, revealing the slotted openings 32, cylindrical openings 33 of the other projections 26, the transverse central bar or intermediate section 25 (dashed lines) of the module, and the solid deck 34 on top of the projections. A second module 40a is partially shown at the right side of FIG. 5, indicating its deck slab 34 and the gap 38 between the decks of the two modules when the belt is in a straight configuration rather than on a curve. FIG. 5 also shows the angled edge 36 which may be included near the extremities of deck structures which will be at the edges of the belt, as one means for nesting the slabs closer together on curves. From FIG. 5 it can be seen that when the belt enters a curve, an edge such as shown in FIG. 5 will encounter convergence or collapsing of the two modules together, thus moving the terminal end 26a of the link end 26 to the left and underneath the deck slab 34 of the module 40, until the connecting rod 30 is substantially at the left extremity of the projection slot 32, at which the deck slabs 34 will be substantially abutted, or very nearly so, with the inter-deck gap 38 substantially closed at that edge of the belt.

FIG. 4 shows the bottom side of a module such as the module 40 shown in FIGS. 3 and 5. The figure reveals the heavier edge projections 42 or integral sideplates of this type of radius belt, as in the '601 patent referenced above, as well as the guide members with hold down tabs 44 extending downwardly and inwardly as in the '601 patent. The bottom side of the solid deck 34 is visible, as is the solid transverse bar 25 forming a central intermediate spine of this type of belt module. In an integrally molded construction, which is preferred, the configuration of the link ends and the connecting spine 25 can be different, since the link ends are integrally retained in position by the solid top deck structure 34. Thus, the intermediate solid bar 25 can be eliminated if desired, although in some high tension conveyor belt applications it may be needed for higher tensile strength. The elimination of the cross bar or transverse intermediate section 25, when possible, can increase the degree of collapse possible at the inner edges of the belt on a curve, i.e. decrease the radius of curve.

FIG. 6 shows another embodiment of a module row 45 for a radius type conveyor belt, the module row 45 including modules 46 and 47. The modules 46 and 47 are both edge modules, the module 47 being considerably wider in order it place a joint 48 at an off-center position for staggering of modules, as discussed above. A succeeding module row (not shown) would have the joint 48 in an off-set location, such as by reversing the sizes of the left and right modules. Additional modules, with half-width link ends 50 such as shown, but at both left and right edges, can be placed between the modules 46 and 47 for increased width.

FIG. 6 shows the modules 46, 47 in plan view, with much of the structure of the link ends 52 and 54 and the structure of the solid intermediate bar 56 hidden and shown in dashed lines. The solid deck 58 is shown covering all but terminal ends 52a, 54a of the projections or link ends.

FIG. 7 shows a portion of this same type of belt module in elevation view, with the right edge shown as having a horizontal slot 60 formed between upper and lower horizontal flanges 62 and 64. The slot 60 is positioned to engage with an inwardly extending horizontal rail connected to the supporting wearstrip (not shown) of stationary structure on which the conveyor belt glides. This structure is an alternative to the guide/hold down structure 44 shown in FIG. 4.

Figure 8:
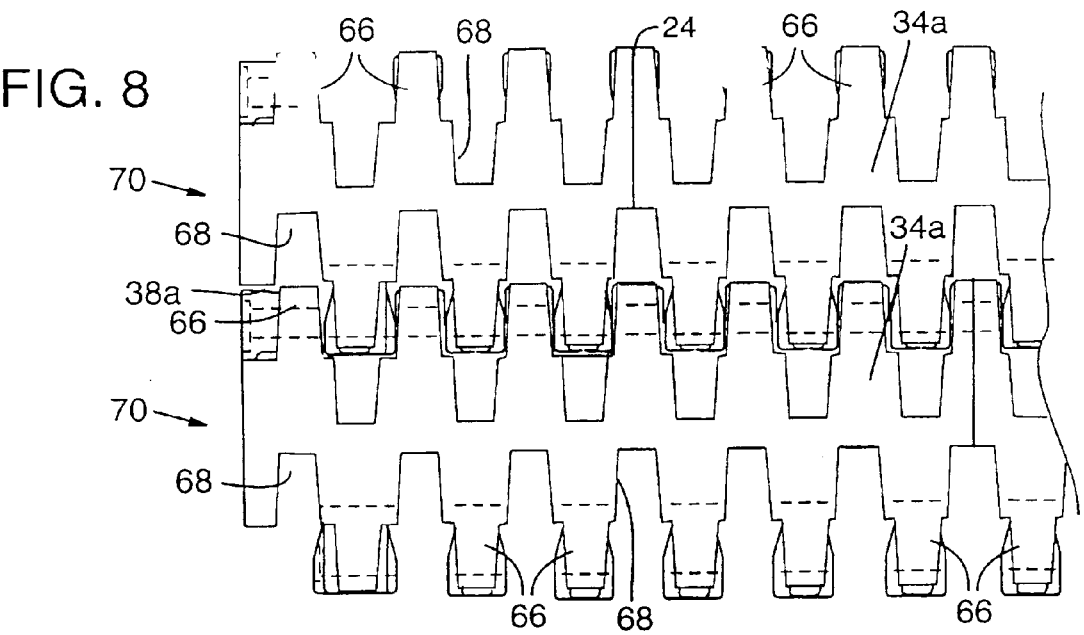
FIG. 8 is a plan view similar to FIG. 1, showing another embodiment.
Figure 8A:
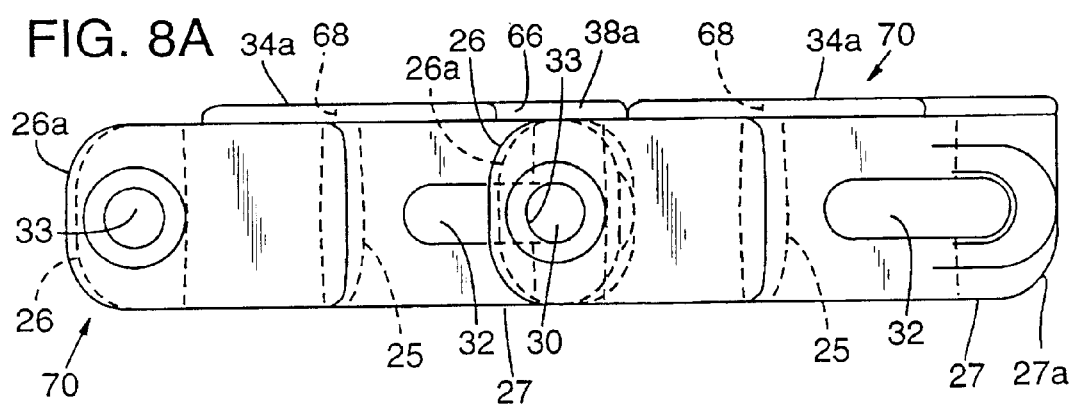
FIG. 8A is a side elevation view indicating modules as in FIG. 8.
Figure 8B:
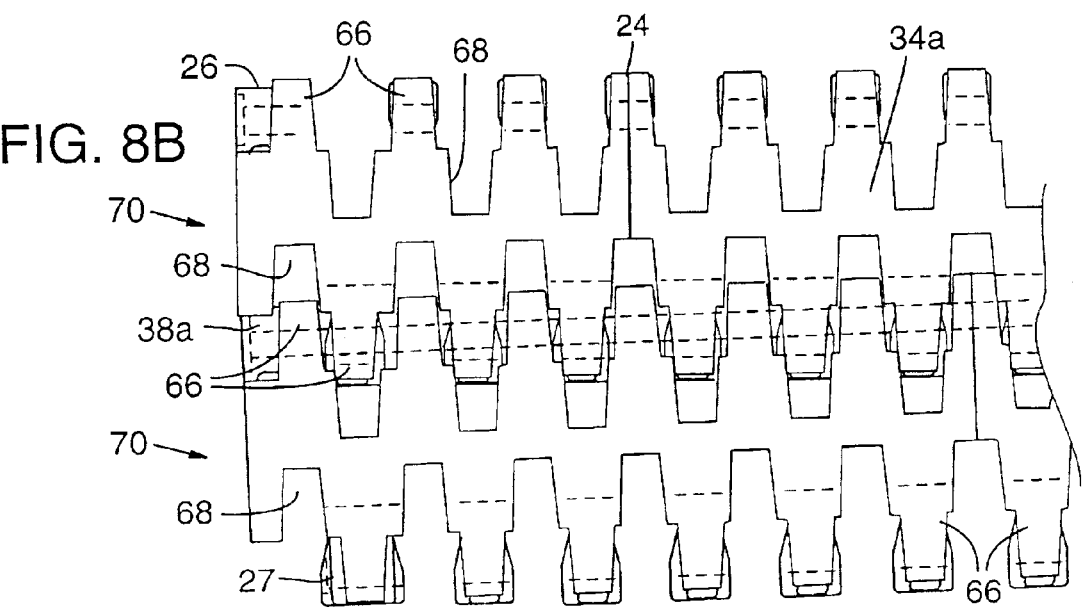
FIG. 8B is a view similar to FIG. 8, showing the modules as nested together on a curve.

FIG. 8 shows in a plan schematic view another embodiment of the invention wherein a series of fingers 66 are included on each module, for engaging within corresponding slots 68 on the opposing adjacent module. The modules are provided with these extending fingers in this embodiment in order to provide a more continuous platform at the level of the top of the solid decks 34*a,* thus reducing the maximum width of the gap 38*a,* where the deck surface dips to the level of the tops of the terminal link ends as in the embodiment shown in FIGS. 1–5. Although the fingers 66 could be independent of the link ends, for reasons of strength and integrity it is preferred that these fingers simply comprise integrally molded bosses or tops on the link ends, with the notches 68 being located between link ends on the opposing module. FIG. 8B shows the modules 70 of FIGS. 8 and 8A in the angled, collapsed inner side configuration of a curve.

Figure 9A:
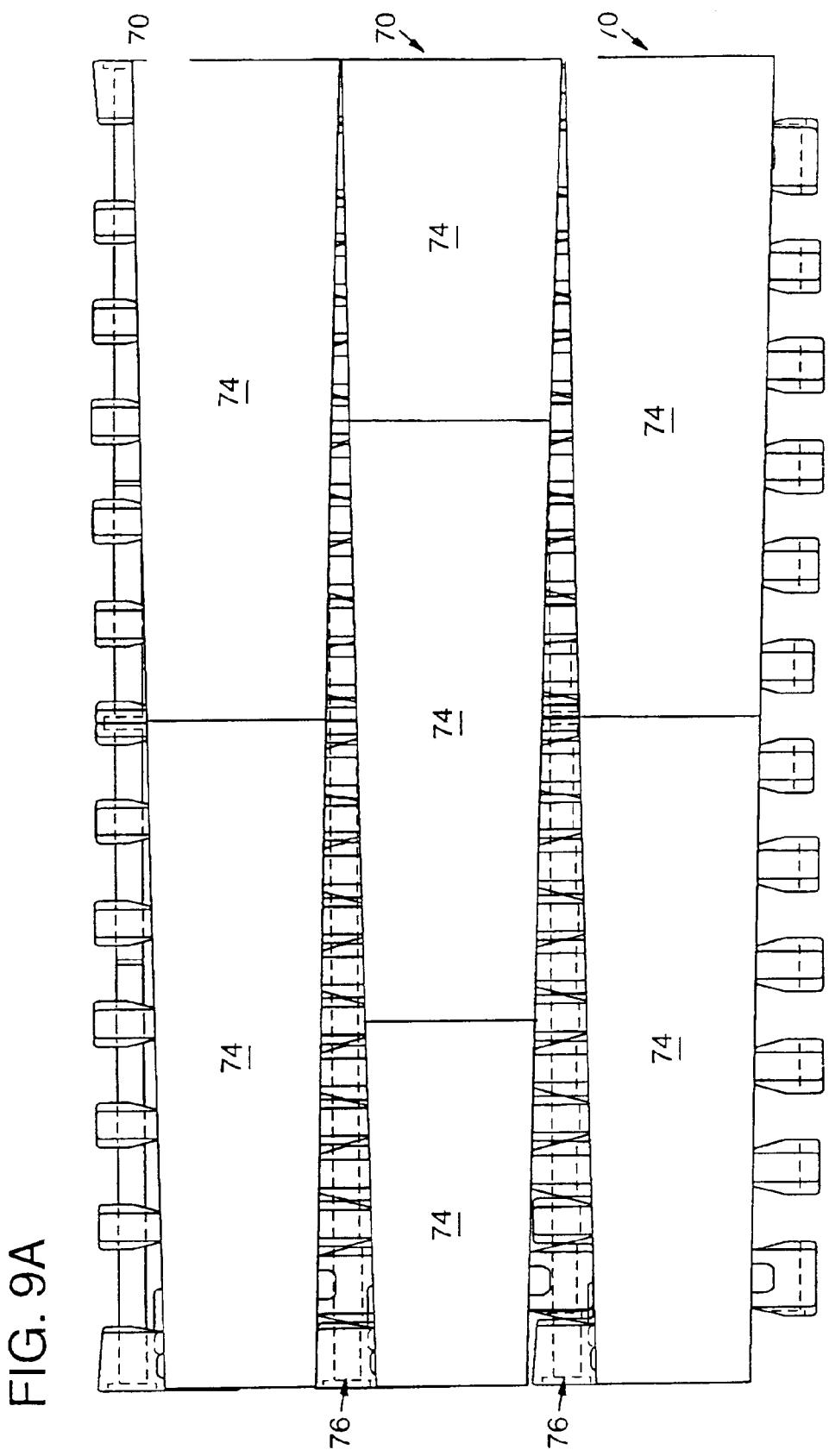
FIGS. 9A and 9B are plan views schematically indicating another embodiment of the invention.
Figure 9B:
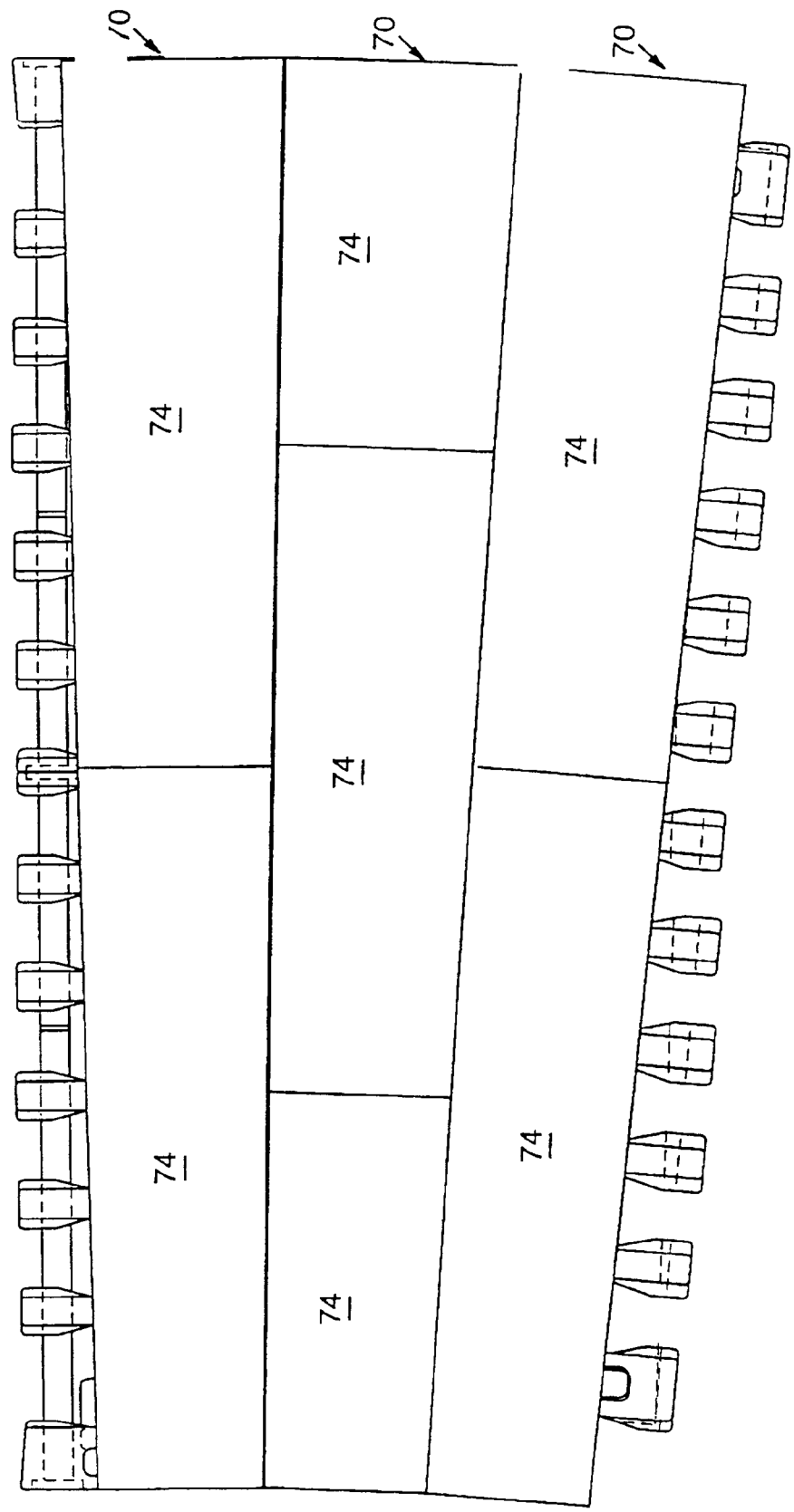

FIGS. 9A and 9B show another embodiment of a conveyor belt and modules of the invention, wherein the belt is intended for straight and curved travel, but with all curves being in the same direction. FIG. 9A schematically indicates three modules or module rows 72, each having a solid deck slab 74 which is essentially trapezoidal in shape leaving triangular gaps 76 between the module rows as indicated. These gaps can be partially lessened by the finger and notch structures 66, 68 shown in FIGS. 8–18B.

FIG. 9B shows the modules 72 collapsed at an inner side 78, traveling around a left curve. In this curving configuration, of a prescribed radius, the deck slabs 74 provide a continuous upper conveying surface.

The above described preferred embodiments are intended to illustrate the principles of the invention, but not to limit its scope. Other embodiments and variations to this preferred embodiment will be apparent to those skilled in the art and may be made without departing from the spirit and scope of the invention.

I claim:

1. In a plastic modular conveyor belt capable of following a path including straight and curving sections and including a series of serially interdigited elongated molded plastic belt module rows being connected by rods extending transversely to the length of the conveyor belt, each module row having a set of a multiplicity of first aligned spaced projections or link ends extending in one direction from the row and a set of a multiplicity of second aligned spaced projections or link ends extending in an opposite direction, the first and second projections of serially adjacent module rows being longitudinally overlapping, interdigited and juxtaposed when the modules are connected serially in the conveyor belt by the connecting rods extending through transverse openings in the projections, the transverse openings of one of said sets of spaced projections being longitudinally elongated slotted holes to accommodate lateral curves wherein the module rows become angularly shifted and collapse together at the inside of the curve, the improvement comprising:

a solid deck forming a top surface of each module, the deck being above the level of the projections and integrally molded with the projections of the module, the solid deck covering a central portion of the module and inner portions of the projections but allowing terminal ends of the projections including said transverse openings to extend outwardly from under the deck such that, when the module rows become angularly shifted and collapse together at the inside of a curve, the projections of one module row are allowed to collapse together substantially completely with the projections of a succeeding module row without limitation by the solid deck, and the solid decks of succeeding module rows being configured to substantially abut one another at inner sides of curves but not to lap over one another, whereby the conveyor belt presents a substantially closed top surface except between the solid decks of succeeding module rows, wherein a space is left open, but which space is substantially closed by the interdigited terminal ends of projections of succeeding rows.

2. The plastic modular conveyor belt of claim 1, wherein the solid deck at the inner edge of the conveyor belt in a module row with respect to a curve has an obliquely angled edge portion which faces and angles away from the succeeding module row so as to allow the solid decks of the adjacent module rows at the inner edge of the curve to nest more closely.

3. The conveyor belt of claim 1, wherein at least some of the module rows are comprised of a plurality of modules side by side, divided by joint lines between modules, and where successive module rows have joint lines offset from row to row, so that the modules of the module rows are staggered from one row to the next increasing the assembled integrity of the conveyor belt.

4. The conveyor belt of claim 1, wherein each solid deck has leading and trailing edges, and further including fingers extending longitudinally relative to the belt from each of the leading and trailing edges, the fingers being at the deck level and positioned to intermesh when the belt travels through a straight portion with the solid decks from row to row maximally separated, thus extending a load-bearing surface of the solid decks partially over the space, and the longitudinally extending teeth being so arranged to permit a deeper intermeshing where the module rows collapse together at the inside of a curve.

5. The conveyor belt of claim 4, wherein each deck leading and trailing edge includes notches into the deck between fingers and positioned to receive fingers of an adjacent module when the modules collapse together at the inside of a curve.

6. The conveyor belt of claim 5, wherein the fingers comprise top structures on the projections, the notches of a module being located between projections of the module.

* * * * *